Jan. 14, 1969   R. A. COVAL ET AL   3,421,996
BATTERIES OF ELECTROCHEMICAL CELLS CONTAINING
ELECTROLYTE METERING TUBES
Filed March 2, 1966

INVENTORS
Robert A. Coval &
BY  Charles W. Schade

L. J. Wallace
ATTORNEY

United States Patent Office 3,421,996
Patented Jan. 14, 1969

---

3,421,996
BATTERIES OF ELECTROCHEMICAL CELLS CONTAINING ELECTROLYTE METERING TUBES
Robert A. Coval and Charles W. Schade, Indianapolis, Ind., assignors to General Motors Corporation, Detroit, Mich., a corporation of Delaware
Filed Mar. 2, 1966, Ser. No. 531,166
U.S. Cl. 204—255        5 Claims
Int. Cl. C23b 5/68

This invention relates to batteries of electrochemical cells and, more specifically, to a means for metering the flow of electrolyte to each cell thereof.

The term electrochemical cell as used herein is intended to include galvanic and electrolytic cells having a liquid electrolyte pumped to or circulated through the unit. Hence, the term is intended to include such devices as electrolyzers, fuel cells, and galvanic cells generally.

In electrolytic cells for the electrochemical decomposition of materials, electrolyte flow rate control through each and every cell is a necessity. Higher cell efficiencies can be achieved by a proper balancing of the electrolyte flow rate, current density, and electrolyte flow distribution within the cell. Electrolyte flow rate should be sufficiently high as to purge the electrode surfaces of any gaseous reactants that might cling thereto thereby polarizing that electrode. At high current densities the flow rate must be correspondingly high to avoid this polarizing effect. On the other hand, too high a flow rate would not permit sufficient reaction time within the cell for the material being decomposed to completely disassociate before being carried out of the cell. This reduces the efficiency of the cell. High efficiencies are also dependent upon the nature of the electrolyte flow pattern between the electrodes, 100% uniformity being the most desirable. To effect substantially uniform flow patterns, the shape of the inlet and outlet ports are important. However, shapes which produce uniform flow patterns often do not serve equally as well as metering means.

Similarly, in certain galvanic batteries, the electrolyte is stored external to the cells before the batteries are used. When the batteries are used, the electrolyte is injected into the cells. Batteries of this type have a long shelf life. However, the use of a plurality of such deferred-action cells in the same apparatus has heretofore not been without difficulties. It has been found practically impossible heretofore to effect simultaneous contact of electrolyte with electrodes, especially where each cell has its own store of electrolyte. This simultaneous contact is essential, for example, where a number of series-connected cells are required to be activated simultaneously at a precise moment to obtain a high polarization voltage.

An electrolyte-introducing manifold having a plurality of similar dispensing ports is not satisfactory. It does not produce uniform mass flow of electrolyte into each cell of large batteries containing a considerable number of cells. Uniform pressure cannot be maintained along the entire length of the manifold. Hence, at points remote from the electrolyte reservoir, the pressure is less than at points proximate to the reservoir. Similarly, the velocity of the electrolyte flow varies along the length of the manifold. Hence, uniform mass flow rates into each cell is not effected. One could vary the dimensions of the inlet ports in each cell of the battery to resolve the problem. However, the cost and manufacturing difficulties associated with such individual attention to each cell renders such an approach unfeasible. On the other hand, we have found a way to make a simple, reliable and practical manifold that solves these problems.

It is, therefore, an object of this invention to provide a means for metering the flow of electrolyte from a common source to each and every cell of a battery of electrochemical cells, which cells are otherwise of uniform construction, both as to materials and dimensions.

It is a further object of this invention to provide a means for effecting uniform electrolyte flow rates and distribution through any number of a plurality of electrochemical cells in a battery of said cells whereby individual cell efficiency is maximized, hence, contributing to a maximum overall battery efficiency.

Further objects and advantages of the present invention will become apparent from the following description of the invention.

Briefly stated, this invention comprises a longitudinally slotted tube in registered relation to the electrolyte flow ports of a battery of electrochemical cells. The battery is comprised of a plurality of dimensionally uniform cell elements. A plurality of orifices are formed at the junctions where the slot meets a corresponding electrolyte flow port. By varying the width of the slot from one end of the tube to the other, such as by a taper, a plurality of orifices are created, each having distinct unique dimensions. Uniform electrolyte mass flow rate into each of the cells may be effected by adjusting the rate of the slot's taper. The widest portion of the slot mates with the cell most remote from the electrolyte source. The narrowest portion of the slot mates with the cell proximate to the electrolyte source. The rate of taper of the slot is adjusted to compensate for the pressure drop in the tube between the first and the last cell of the battery. Likewise, should it be desired so to do, other than uniform flow rates may be obtained by making appropriate adjustments to the slot. This may be done simply and inexpensively while at the same time maintaining the constructional and dimensional uniformity of the individual cell elements themselves.

Figure 1:
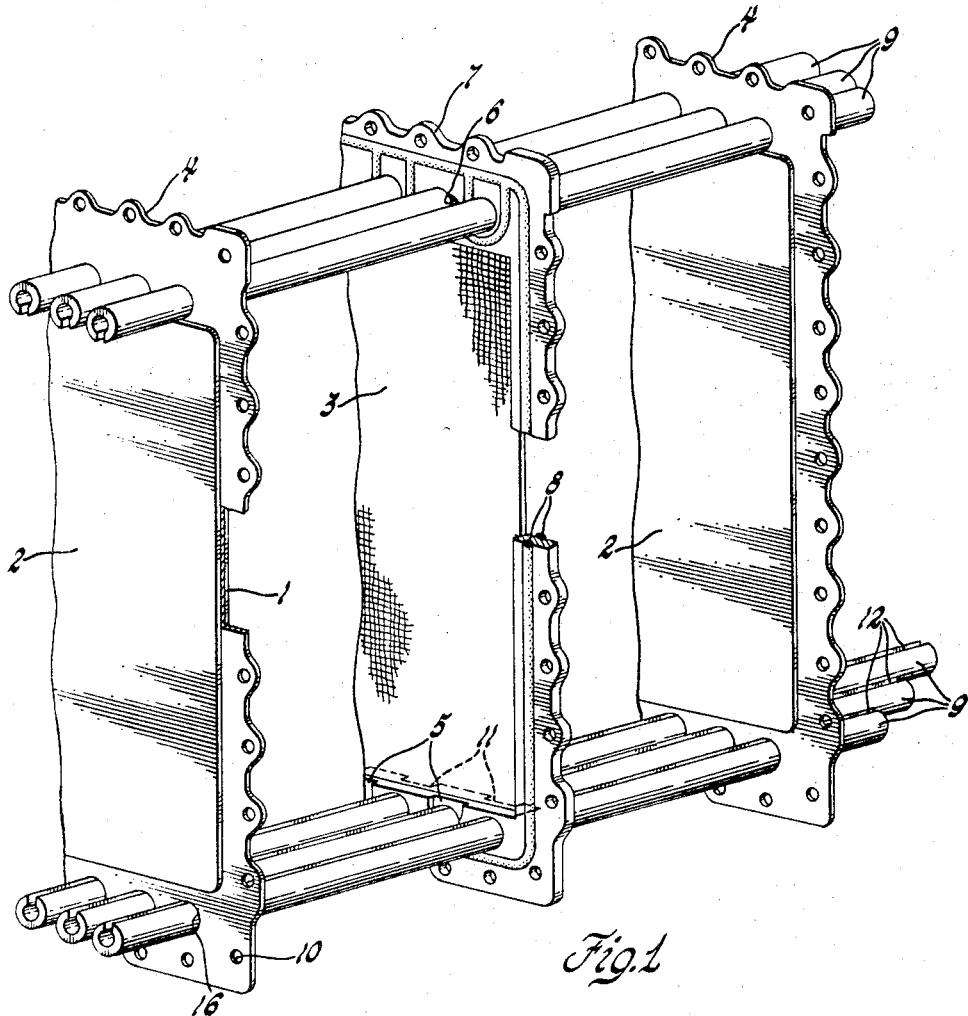
FIGURE 1 is an exploded view of the components of but one of a plurality of cells which make up a battery of electrolytic cells.
Figure 2:
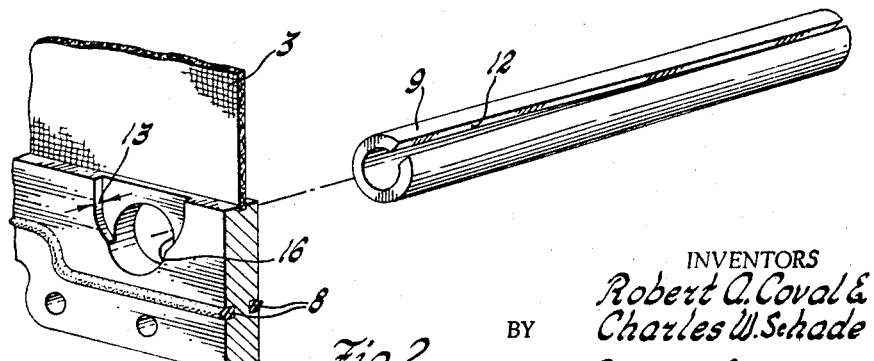
FIGURE 2 is an enlargement of one port and mating tube of FIGURE 1.

Referring to the drawings, FIGURE 1 is an exploded view of but one of a plurality of cells which make up a battery of electrolytic cells for the electroylsis of $H_2O$ comprising bipolar electrodes 4 having cathode and anode plates 1 and 2 respectively separated by a plastic electrical insulator and separator frame assembly 7. The assembly 7, in addition to separating the bipolar electrodes 4, circumscribes an electrolyte enclosure for each cell of the battery. The anode side 1 of the bipolar electrode 4 is an iron sheet which has been nickel plated to reduce oxygen overvoltage. The cathode side 2 is an iron sheet which has been plated with cobalt to reduce hydrogen overvoltage. A separator 3, such as asbestos cloth, divides each electrolyte enclosure into an anolyte chamber and a catholyte chamber. In a given battery, a plurality of such cells are sandwiched together and held in place by holding means, i.e., bolts (not shown) which extend through insulating spool and tie bolt holes 10. Seals 8, in addition to supplementing the electrical insulator, seal the electrolyte within the cells of the battery, hence, preventing leakage from between the plates. The anolyte inlet and outlet ports 5 and 6 respectively and catholyte inlet ports 11 may be formed by cutting away, such as by undercutting to a desired depth 13, portions of the surfaces of the electrical insulator and separator frame assembly 7 as shown in the drawing. These ports should have a configuration such as to insure a uniform flow of electrolyte across the face of the electrode. The catholyte outlet ports are not shown but they correspond to the anolyte outlet ports as shown. It has been found that a generally semicircular undercut which mates with the metering tube 9, as shown in the drawing, is particularly effective to produce the desired uniform electrolyte flow pattern. The manifold tubes 9 have slots 12 cut therein. Upon insertion into the manifold alignment and retention holes 16, the slot acting in concert with the inlet or outlet ports as applicable forms a plurality of orifices which have cross sectional areas that vary from cell to cell depending on the average width of the slot at its junction with a port. Each orifice varies in size, corresponding to the average width of the slot.

EXAMPLE

An electrolyte (e.g. $KOH+H_2O$) inlet manifold tube 9′ having a linearly tapered slot 12, is inserted into the manifold alignment and retention holes 16 so as to have the widest portion of the taper mating with the cell most remote from the electrolyte source. To insure uniform electrolyte mass flow rate through each cell the configuration of the taper is determined in such a manner as to take into account the pressure drop from one end of the tube to the other. Hence, at the cell most remote from the electrolyte source where the pressure and velocity of the electrolyte is least, the orifice formed must be the largest, and at the cell proximate to the electrolyte source where the pressure and velocity of the electrolyte is greatest, the orifice must be the smallest. Once the most desirable mass flow rate to effect maximum cell efficiency is determined, one computes the desired orifice opening for each cell, and hence the amount of taper required, by equating the mathematical expressions used to determine the mass flow rates for each cell to the desired mass flow rate and solving for the orifice area factor. Hence, the formula, $$M = dVA$$

where

M = Mass flow rate #/min. (optimum)
d = Electrolyte density #/ft.³
V = Electrolyte velocity ft./min.
A = Area of the orifice ft.²

The velocity (V) of the electrolyte flowing in the tube will vary with the length of the tube and hence must be computed on a cell-to-cell basis in order to determine the required orifice opening which must coact with that velocity to yield a constant mass flow rate. The individual velocities at each cell may be computed using Bernoullis Theorem and the known flow characteristics of the tube and the fluid. If for any reson one would want to have other than uniform mass electrolyte flow through each cell, the nature of the slot might be so constructed as to effect the particular flow rates desired without modifying any of the individual cell components themselves.

Though the invention has been described in terms of certain preferred embodiments, it is to be understood that others may be adapted and that the scope of my invention is not limited except by the appended claims.

We claim:

1. In a battery of electrochemical cells wherein each cell comprises an anode, a cathode, and an electrical insulator separating said anode and said cathode and forming an electrolyte chamber between said anode and said cathode, said electrical insulator having an electrolyte inlet port therein, said insulators being provided with aligned holes connecting said inlet ports, a means for metering the flow of electrolyte to each of said electrolyte chambers of said cells of said battery comprising at least one longitudinally extending tube passing through said aligned holes and provided with a longitudinal slot in registered relation to said ports whereby orifices are formed at the junctions of said ports and said slot, each orifice having a cross sectional area equal to the width of said slot by the depth of said ports.

2. The battery as defined in claim 1 wherein said inlet port is undercut into said insulator.

3. The battery as defined in claim 2 wherein said inlet port is substantially semicircular.

4. The battery as defined in claim 1 having a series of cells including a first cell and a last cell wherein said slot tapers from its junction with the port of the last cell of said battery to its junction with the port of the first cell of said battery.

5. A battery of electrolytic cells comprising a plurality of dimensionally uniform electrolytic cells, each of which comprises an anode, a cathode and an electrical insulator between said anode and cathode, said insulator circumscribing an electrolyte chamber between said anode and said cathode, said insulator having electrolyte inlet and outlet ports formed therein and being provided with aligned holes connecting said inlet ports and outlet ports respectively, an ion pervious separator carried by said insulator to divide said electrolyte chamber in a plane substantially parallel to said anode and said cathode into anolyte and catholyte chambers respectively, and an electrolyte metering means comprising a tube passing through said aligned holes and having at least one longitudinally extending uniformly tapering slot therein, which slot is in registered relation to said ports, whereby a plurality of electrolyte metering orifices are formed at the junctions of said ports and said slot, each orifice having different cross sectional areas equal to the average width of said slot by the depth of said port at said junction.

References Cited

UNITED STATES PATENTS

| | | | |
|---|---|---|---|
| 633,066 | 9/1899 | Brewer | 137—592 XR |
| 2,075,688 | 3/1937 | Zdansky | 204—256 |
| 2,862,864 | 12/1958 | Berghaus | 204—256 |
| 3,331,704 | 7/1967 | Vickers et al. | 136—86 |
| 3,343,989 | 9/1967 | Hasbrouck et al. | 136—86 |

JOHN H. MACK, Primary Examiner.

D. R. JORDAN, Assistant Examiner.

U.S. Cl. X.R.

136—86; 137—592; 204—263, 301